US006325393B1

(12) United States Patent
Chen et al.

(10) Patent No.: US 6,325,393 B1
(45) Date of Patent: Dec. 4, 2001

(54) CHUCK DEVICE FOR TOOLS

(76) Inventors: Tsai-Ching Chen, P.O. Boc 63-247; Chiu-Man Chang-Kao, P.O. Box 63-247, both of Taichung (TW)

( * ) Notice: Subject to any disclaimer, the term of this patent is extended or adjusted under 35 U.S.C. 154(b) by 0 days.

(21) Appl. No.: 09/677,289

(22) Filed: Oct. 2, 2000

Related U.S. Application Data

(63) Continuation-in-part of application No. 09/410,536, filed on Oct. 1, 1999.

(51) Int. Cl.[7] ...................................................... B23B 31/07

(52) U.S. Cl. ................................ 279/22; 279/30; 279/75; 279/155; 279/905

(58) Field of Search ................................ 279/22, 30, 74, 279/75, 155, 905

(56) References Cited

U.S. PATENT DOCUMENTS

| | | | | |
|---|---|---|---|---|
| 1,119,276 | * | 12/1914 | Griffith et al. | 279/75 |
| 1,516,257 | * | 11/1924 | White | 279/74 |
| 2,135,861 | | 11/1938 | Thompson . | |
| 3,788,658 | * | 1/1974 | Benjamin et al. | 279/75 |
| 4,577,875 | * | 3/1986 | Miyakawa | 279/75 |
| 4,692,073 | | 9/1987 | Martindell . | |
| 4,850,758 | | 7/1989 | Morgan . | |
| 4,900,202 | | 2/1990 | Wienhold . | |
| 5,013,194 | | 5/1991 | Wienhold . | |
| 5,062,749 | * | 11/1991 | Sheets | 279/75 |
| 5,398,946 | * | 3/1995 | Quiring | 279/30 |
| 5,452,906 | | 9/1995 | Huff et al. . | |
| 5,476,273 | | 12/1995 | Shadeck et al. . | |
| 6,199,872 | | 3/2001 | Hasan . | |

FOREIGN PATENT DOCUMENTS

3324756 A1 1/1985 (DE) .

* cited by examiner

*Primary Examiner*—Steven C. Bishop
(74) *Attorney, Agent, or Firm*—Alan Kamrath; Rider, Bennett, Egan & Arundel, LLP

(57) ABSTRACT

A chuck device for a tool of the type having a bit on an end thereof and a drill on the other end thereof includes a spindle with a stub formed on an end thereof, a tube including a first section mounted around the stub of the spindle and a second section, a sliding sleeve slidably mounted around the tube, and a ball partially received in a transverse countersink in the second section of the tube. A first elastic member is mounted around the tube and attached between an outer shoulder of the tube and an inner shoulder of the sliding sleeve. A second elastic member includes a first end received in the stub and a second end in the tube. When the chuck device is in a condition not receiving the tool, the ball is moved out of the longitudinal hole of the tube and partially located in the annular groove of the sliding sleeve under the action of the second elastic member, and the first elastic member is in a compressed status. When one of the drill and the bit of the tool is inserted into the longitudinal hole of the tube to a position where an annular retaining groove of a shank of the tool aligns with the transverse countersink of the tube, the second elastic member is compressed, the second elastic member returns and thus causes the sliding sleeve to slide along a longitudinal direction of the tube, thereby moving the ball inward to partially engage with the annular retaining groove of the tool bit, thereby retaining the tool in place. When the sliding sleeve is slid along the longitudinal direction of the tube to the position where the annular groove of the sliding sleeve aligns with the transverse countersink of the tube, the second elastic member returns and thus ejects the tool in the longitudinal hole of the tube.

20 Claims, 12 Drawing Sheets

CHUCK DEVICE FOR TOOLS

CROSS REFERENCE TO RELATED APPLICATION

This is a continuation-in-part application of U.S. patent application Ser. No. 09/410,536 filed on Oct. 1, 1999.

BACKGROUND OF THE INVENTION

1. Field of the Invention

The present invention relates to a chuck device for tools, and more particularly to a chuck device that allows a tool of the type having a bit on an end thereof and a drill on the other end thereof to be mounted to and removed from the chuck device by a single hand.

2. Description of the Related Art

FIGS. 12 and 13 of the drawings illustrates a conventional chuck device for tool bits of a pneumatic device that includes an outer cover 90 biased by a spring 93. When a tool bit 94 is inserted into the chuck device, the user has to use one hand to move the outer cover 90 downward (as viewed from FIG. 12) to move a ball 92 to a position engaging with an annular recess 95 in the tool bit 94. Then, the outer cover 90 is released and the spring 93 is returned to retain the ball 92 in place. Nevertheless, when the tool bit 94 and/or the chuck device is subjected to a shock, the ball 92 is apt to be moved into an annular groove 91 of the outer cover 90 under the action of the spring 93. The tool bit 94 is thus disengaged. The present invention is intended to provide a chuck device that mitigates and/or obviates the above problems.

SUMMARY OF THE INVENTION

It is a primary object of the present invention to provide an improved chuck device that allows a tool of the type having a bit on an end thereof and a drill on the other end thereof to be mounted to and removed from the chuck device by a single hand.

In accordance with the present invention, the tool is ejected automatically when removing the tool from the chuck device. In addition, the tool is of the type having a bit on an end thereof and a drill on the other end thereof to provide an additional function selection for the user.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
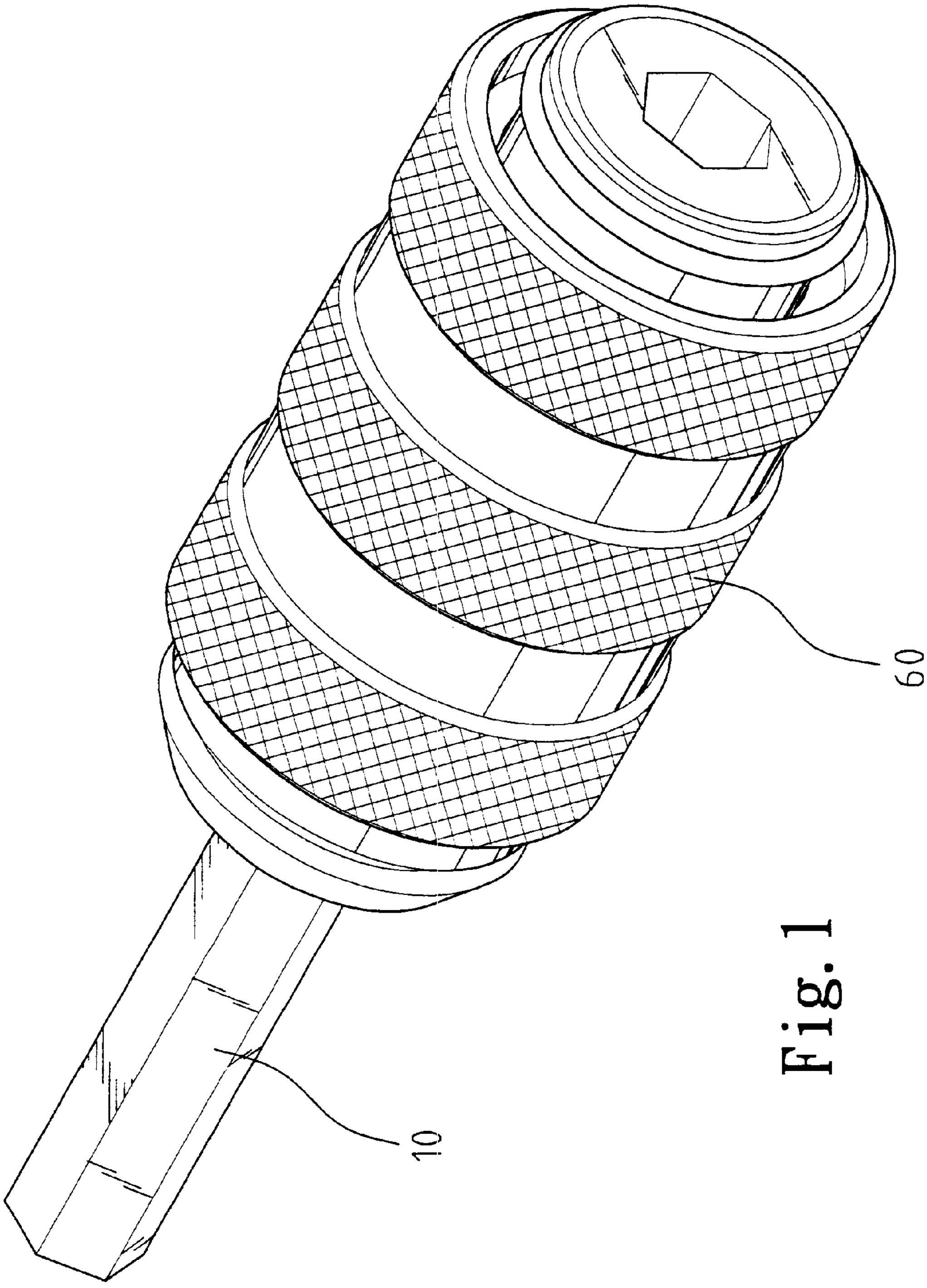
FIG. 1 is a perspective view of a chuck device in accordance with the present invention.
Figure 2:
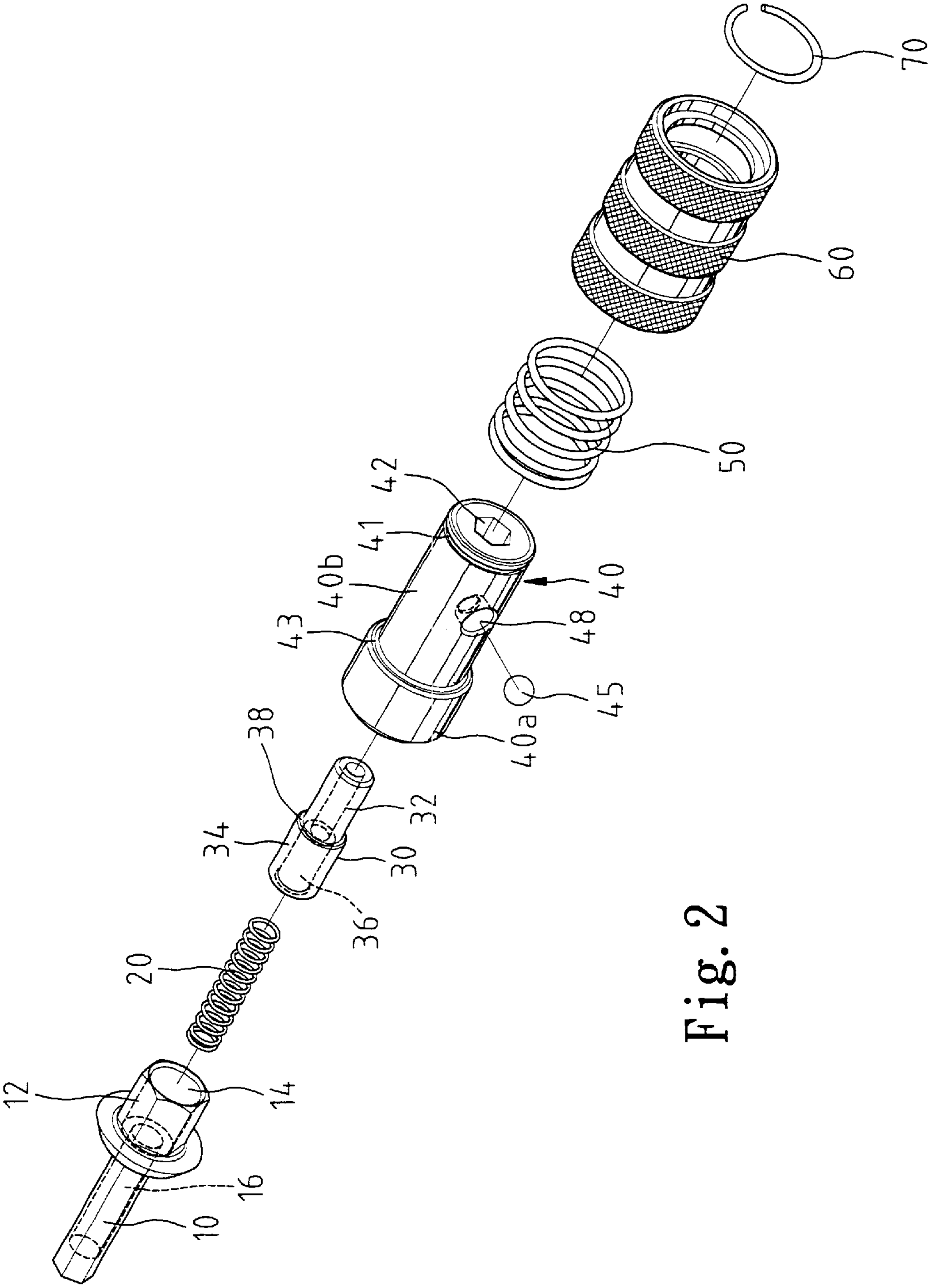
FIG. 2 is an exploded perspective view of the chuck device in accordance with the present invention.
Figure 3:
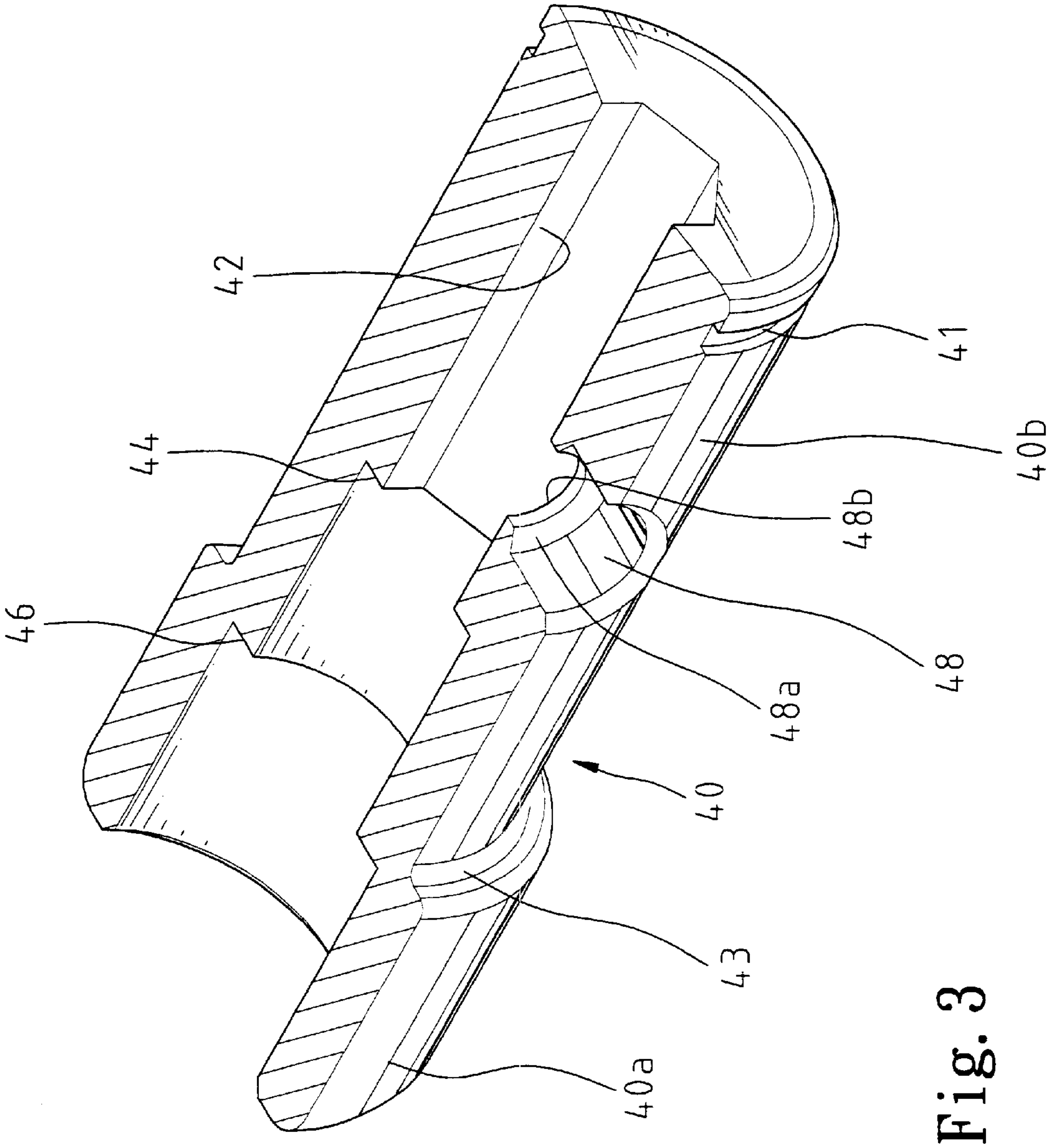
FIG. 3 is a cut-away perspective view of a tube of the chuck device in accordance with the present invention.
Figure 4:
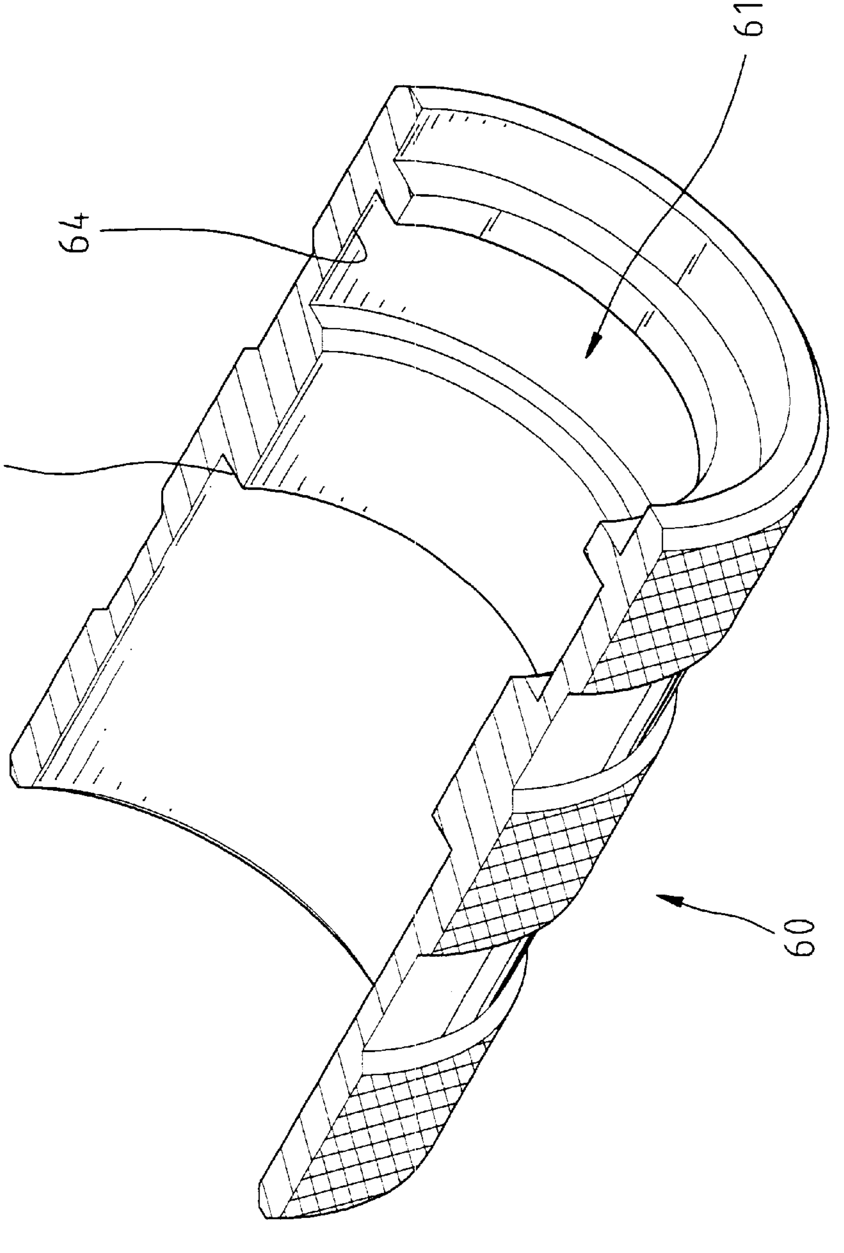
FIG. 4 is a cut-away perspective view of a sliding sleeve of the chuck device in accordance with the present invention.
Figure 5:
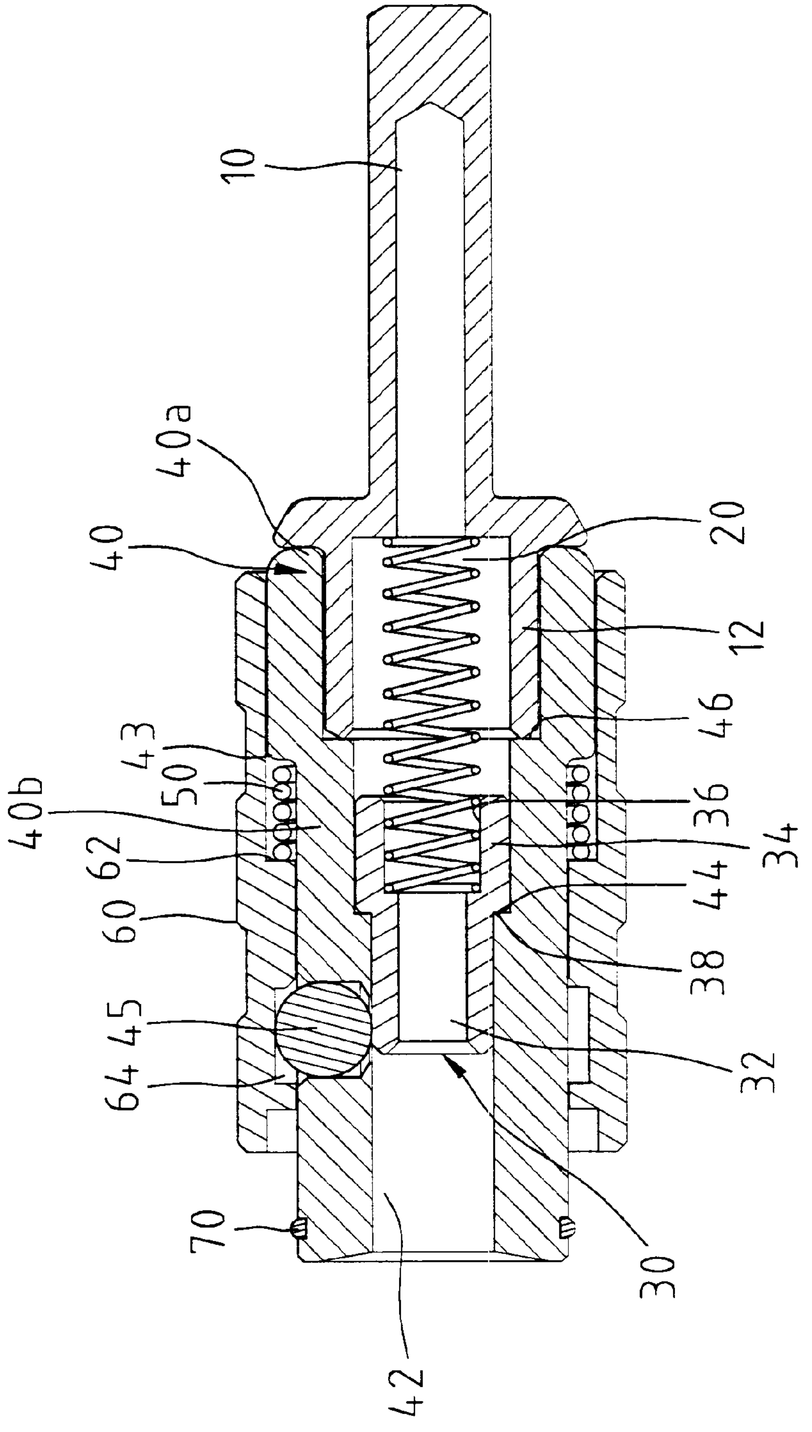
FIG. 5 is a sectional view of the chuck device in accordance with the present invention.

Referring to FIGS. 1 through 11 and initially to FIGS. 1, 2, and 5, a chuck device in accordance with the present invention generally includes a spindle 10, a follower 30, a tube 40, and a sliding sleeve 60. The spindle 10 may be attached to a handle (not shown) or a driving means (not shown) of a pneumatic or electric device (not shown).

The spindle 10 includes a stub 12 formed on an end thereof and having a compartment 14. The spindle 10 further includes a receptacle 16 that is communicated with the compartment 14 of the stub 12, which will be described later. Referring to FIGS. 2, 3, and 5, the tube 40 includes a first section **40*a* mounted around the stub 12 and a second section 40*b* having an outer diameter smaller than the first section 40*a*, thereby defining an outer shoulder 43 on an outer periphery of the tube 40. The tube 40 further includes a longitudinal hole 42 having two stepped sections, thereby defining two inner shoulders 44 and 46. In addition, a transverse countersink 48 is defined in the second section 40*b*, a bottom wall 48*a* defining the transverse countersink 48 having a hole 48*b* communicated with the longitudinal hole 42 of the tube 40**.

Still referring to FIGS. 2 and 5, the follower 30 is mounted in the tube 40 and includes a first section 34, a second section 32, an outer shoulder 38 formed between the first section 34 and the second section 32, and a receptacle 36 defined in the first section 34. As illustrated in FIG. 5, the outer shoulder 38 of the follower 30 bears against the inner shoulder 44 of the tube 40 under the action of an elastic member 20 that is received in the compartment 14 of the spindle 10 and the receptacle 36 of the follower 30.

Referring to FIGS. 2, 4, and 5, the sliding sleeve 60 is slidably mounted around the tube 40 and includes a longitudinal bore 61, an annular groove 64 in an inner periphery thereof, and an inner shoulder 62 formed on the inner periphery thereof. As illustrated in FIG. 5, an elastic member 50 is mounted around the second section **40*b* of the tube 40 and attached between the inner shoulder 62 of the sliding sleeve 60 and an outer shoulder 43 of the tube 40. A ball 45 is received in the transverse countersink 48 of the tube 40 and biased inward by the inner periphery of the sliding sleeve 60 so as to partially protrude into the longitudinal hole 42 of the tube 40 under the action of the elastic member 50 when desired. A C-clip 70 is engaged in an annular groove 41 in the outer periphery of the tube 40 for preventing disengagement of the sliding sleeve 60 from the tube 40, best shown in FIG. 5**.

Figure 6:
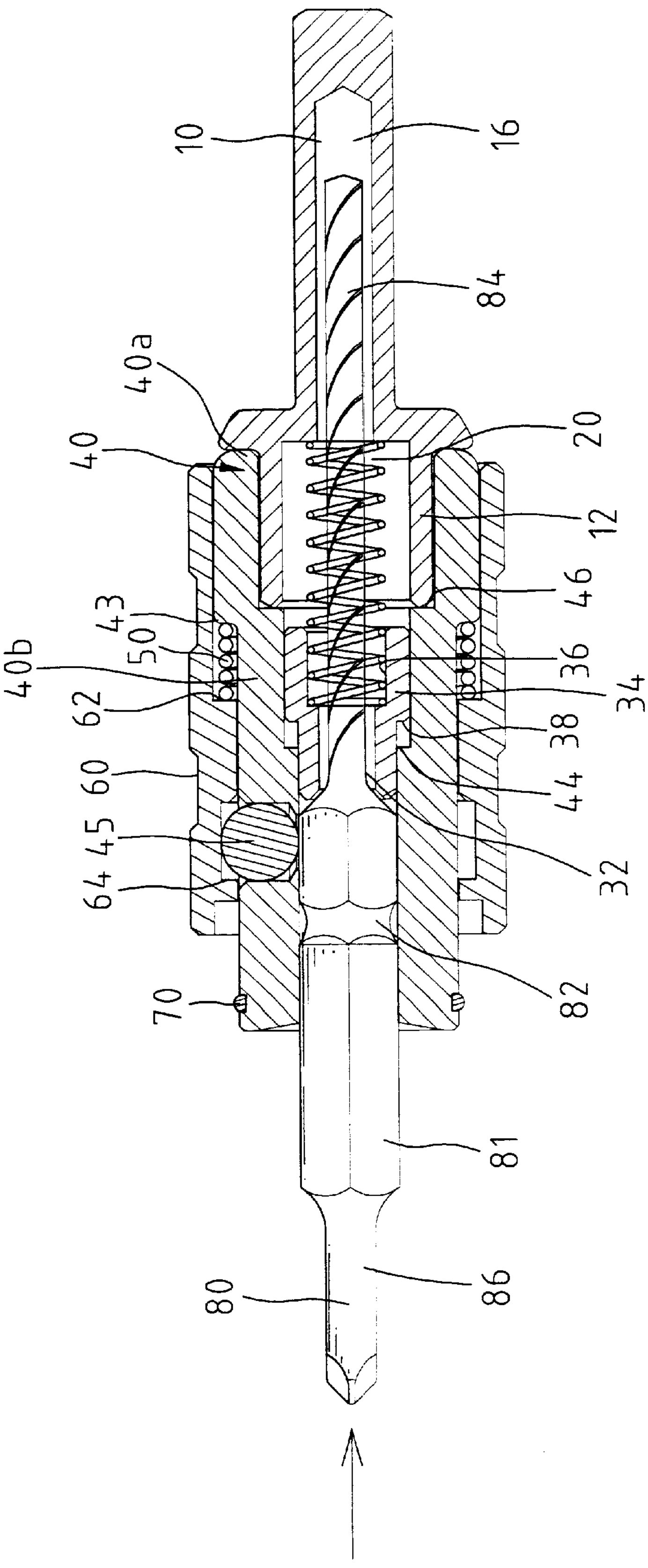
FIG. 6 is a sectional view illustrating insertion of a tool held into the chuck device.
Figure 7:
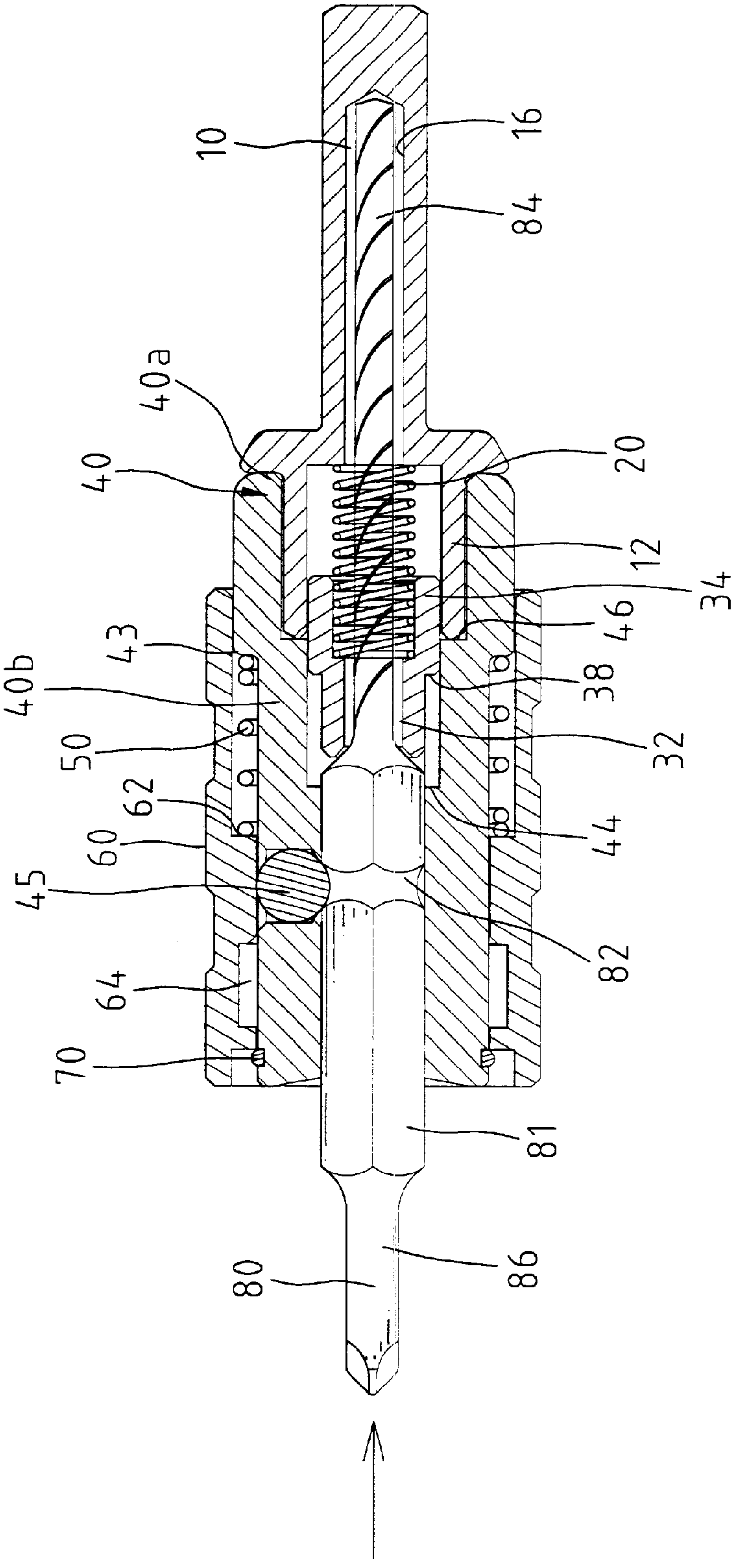
FIG. 7 is a sectional view similar to FIG. 6, wherein the tool has been inserted into the chuck device.
Figure 8:
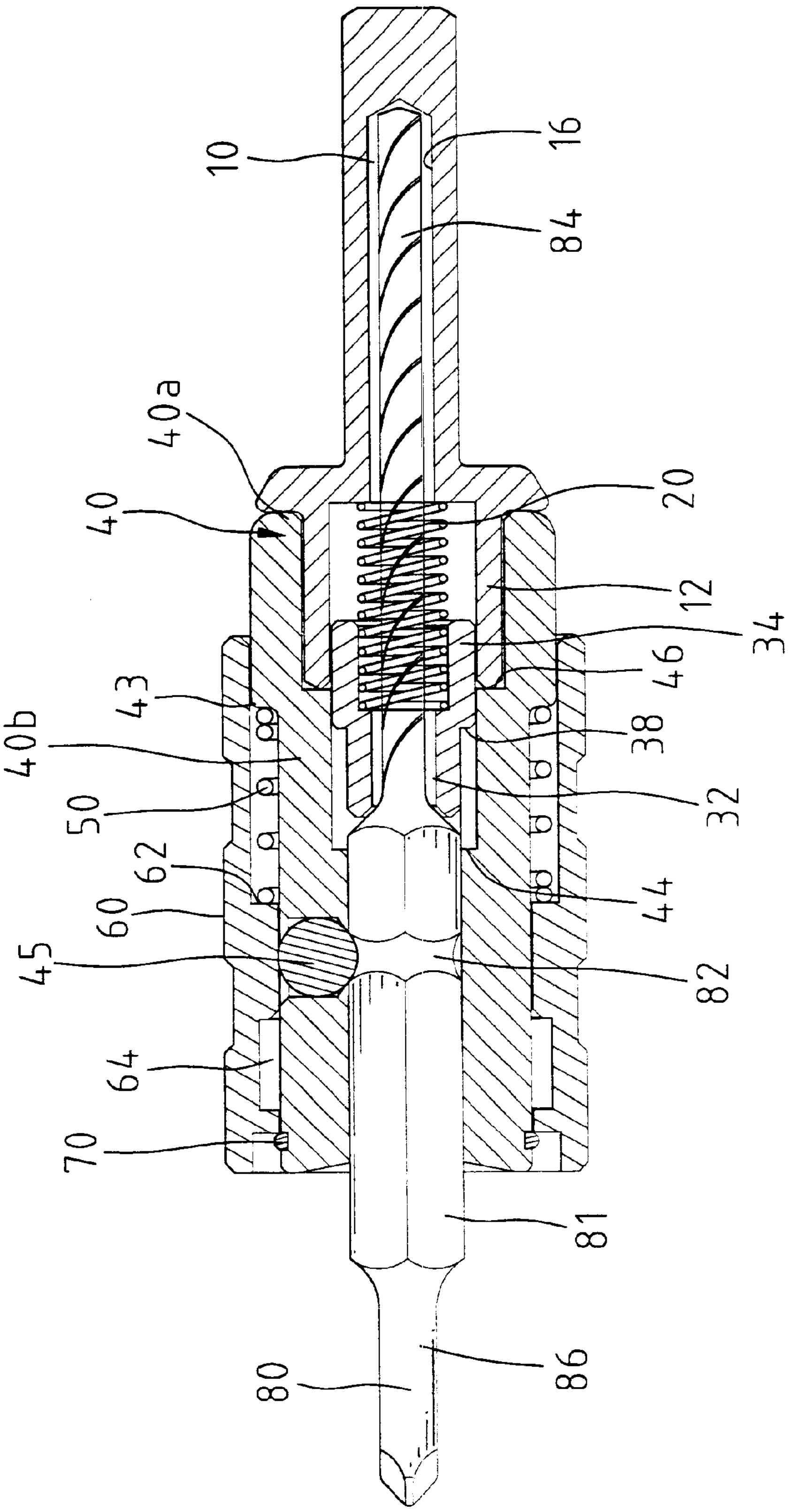
FIG. 8 is a sectional view similar to FIG. 7, wherein the tool is retained in place with the bit of the tool being ready for use.

Referring to FIG. 5, the ball 45 is biased by the first section 34 of the follower 30 and thus partially protrudes into the annular groove 64 of the sliding sleeve 60. The elastic member 50 is compressed. Referring to FIG. 6, when inserting a tool 80 (of the type having a shank 81 with a bit 86 projecting from an end of the shank 81 and a drill 84 projecting from the other end of the shank 81) into the chuck device, the tool 80 is held by a user (with only one hand) and inserted into the longitudinal hole 42 of the tube 40 with the drill 84 extended into the receptacle 16 of the spindle 10 until an annular retaining groove 82 of the shank 81 of the tool 80 is aligned with the ball 45, as shown in FIG. 7. It is appreciated that the ball 45 is disengaged from the annular groove 64 of the sliding sleeve 60. In this status, the ball 45 is allowed to move inward under the action of the elastic member 50 that causes longitudinal sliding movement of the sliding sleeve 60, which, in turn, causes the inward movement of the ball 45. Thus, the shank 81 of the tool 80 is retained in place by the ball 45 under the action of the elastic member 50, as shown in FIG. 8. The bit 86 of the tool 80 is ready for use. The elastic member 20 is compressed. It is appreciated that insertion of the tool 80 is accomplished by a single hand.

Figure 9:
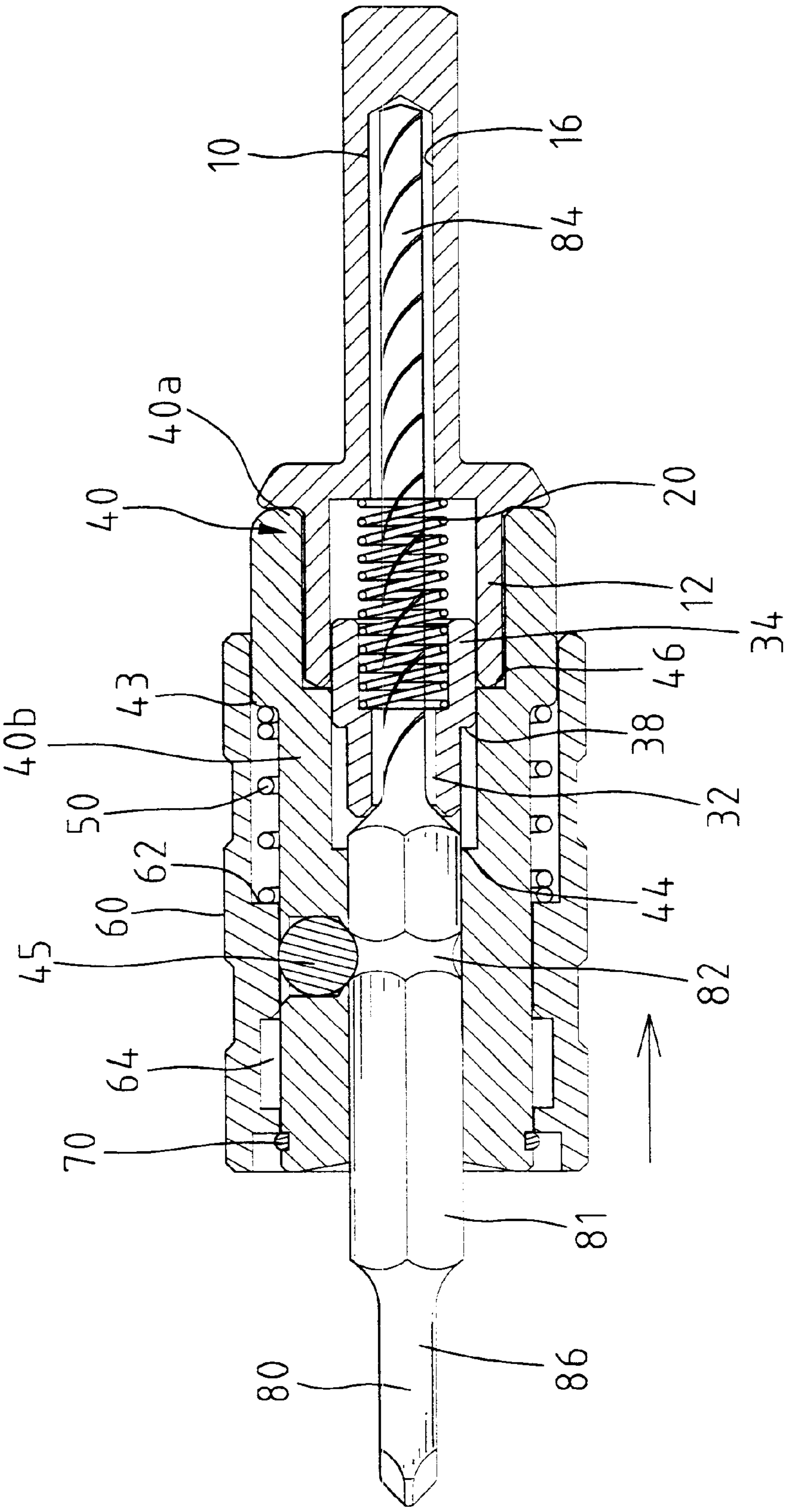
FIG. 9 is a sectional view illustrating removal of the tool from the chuck device.
Figure 10:
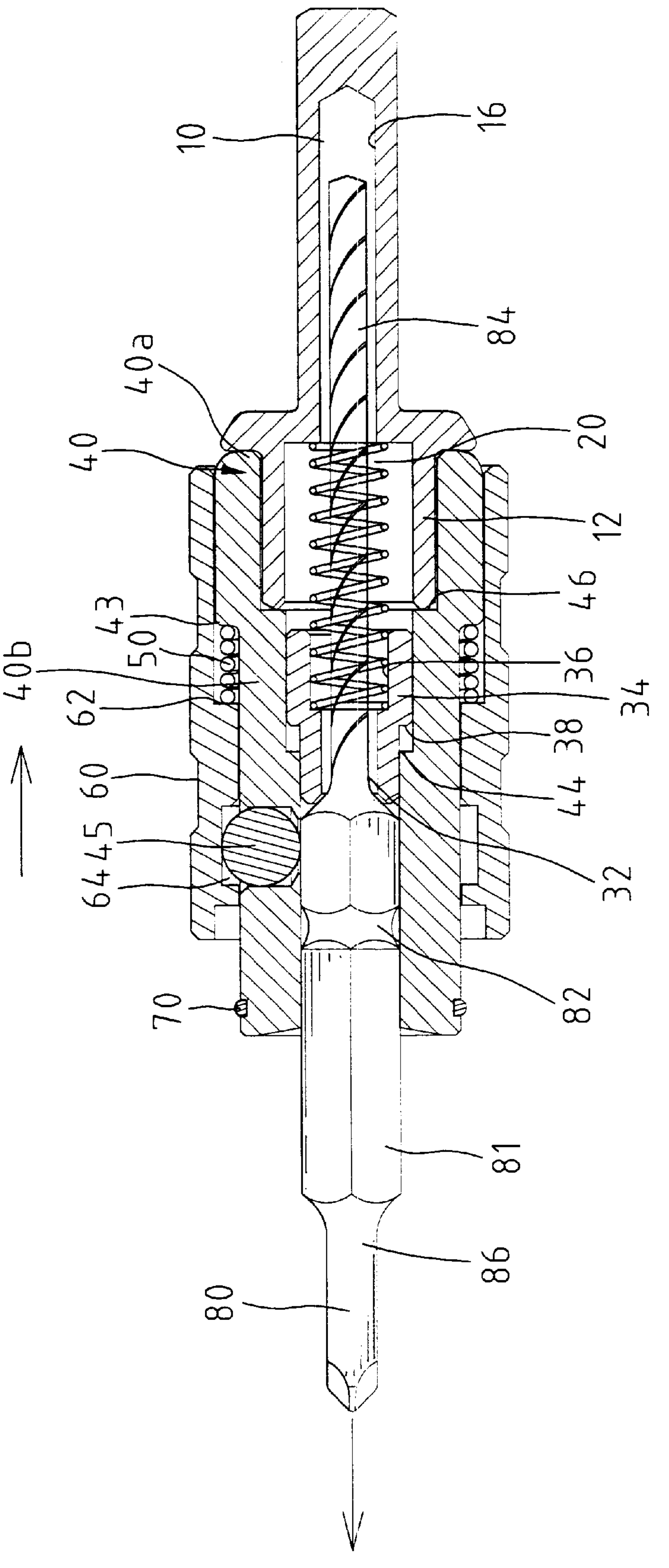
FIG. 10 is a sectional view similar to FIG. 9, wherein the tool is being ejected outward under the action of an elastic member.

Referring to FIG. 9, when removing the tool 80 from the chuck device, the sliding sleeve 60 is moved away from the tool 80 (see the arrow) until the annular groove 64 of the sliding sleeve 60 is aligned with the ball 45, as shown in FIG. 10. In this status, returning movement of the elastic member 20 ejects the tool 80 outward, as the ball 45 is allowed to move into the annular groove 64. Thus, removal of the tool is accomplished by a single hand.

According to the above description, it is appreciated that mounting/removal of the tool 80 onto/from the chuck device can be conveniently accomplished by a single hand. In addition, it is noted that the follower 30 can be omitted, and an end of the elastic member 20 is made longer to directly urge the ball 45 outward.

Figure 11:
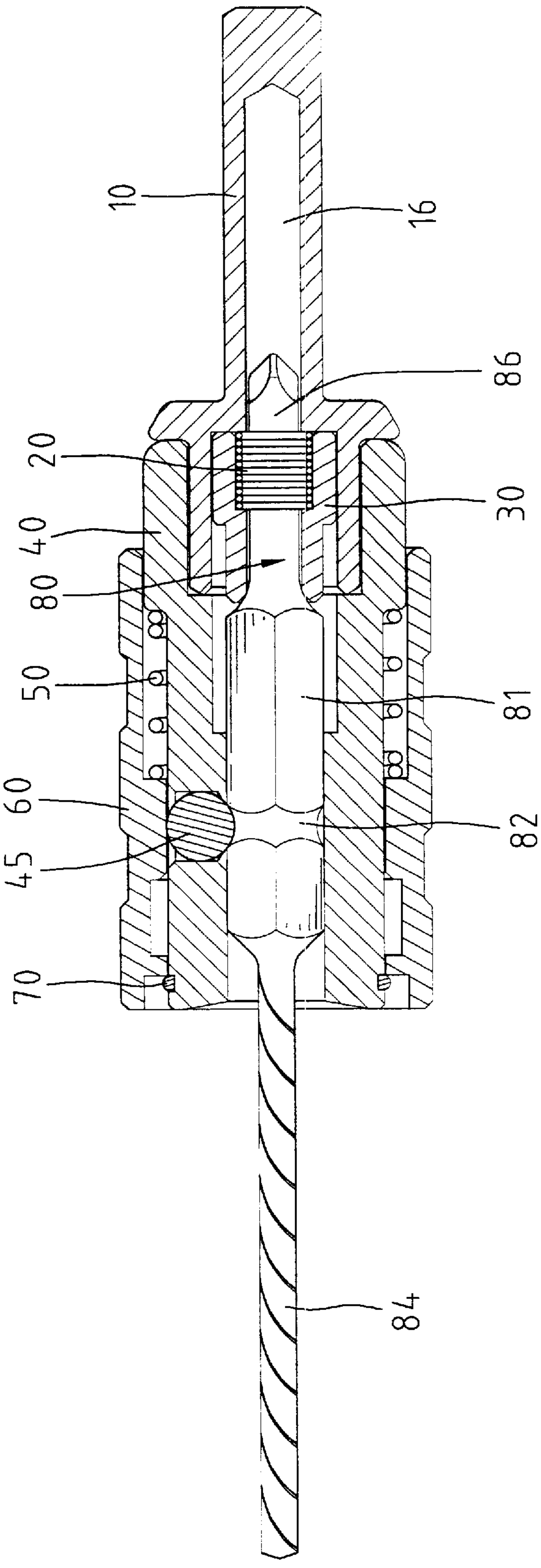
FIG. 11 is a sectional view similar to FIG. 8, wherein the tool is retained in place with the drill of the tool being ready for use.
Figure 13:
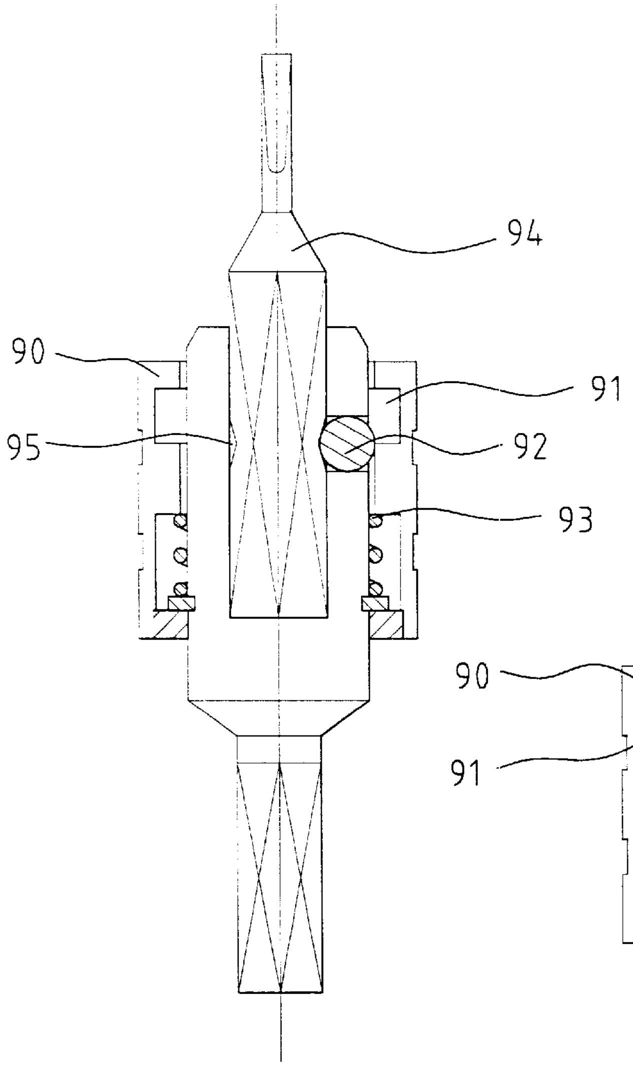
Fig. 13 PRIOR ART
FIG. 13 is a sectional view of the tool bit and the conventional chuck device in FIG. 12.
Figure 12:
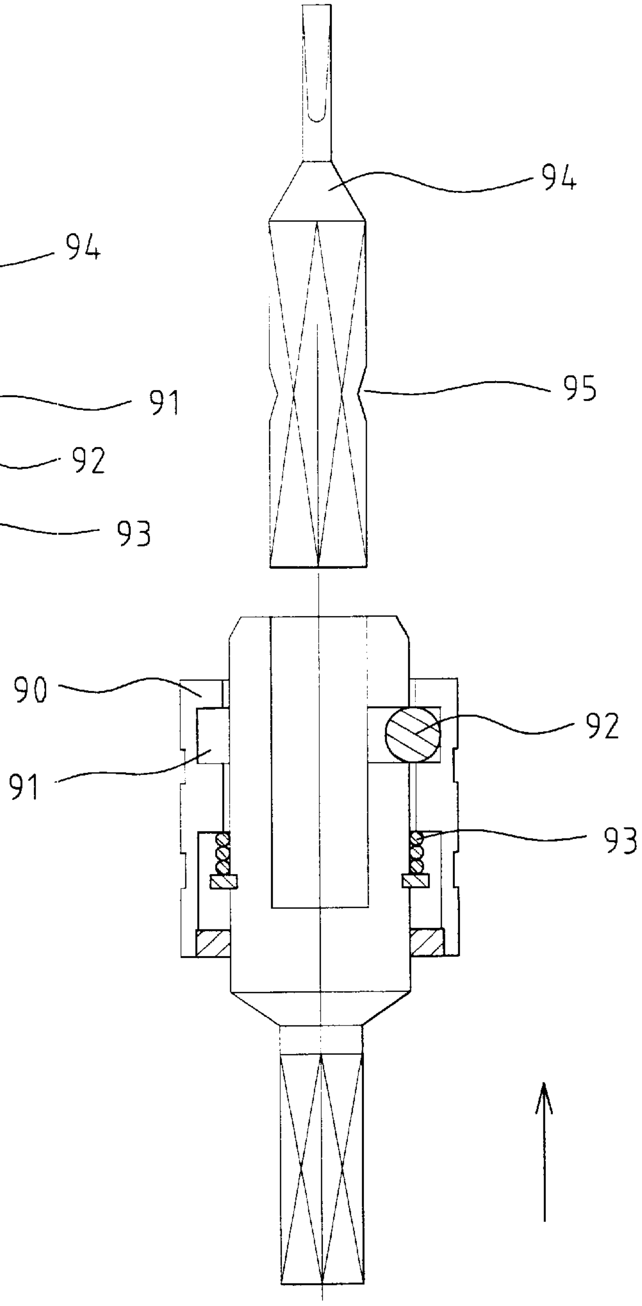
Fig. 12 PRIOR ART
FIG. 12 is a sectional view of a tool bit to be inserted into a conventional chuck device.

FIG. 11 illustrates use of the drill 84 of the tool 80, wherein the tool 80 is retained in place in a manner similar to the operation for inserting the tool 80 into the chuck device for using the bit 86. As illustrated in FIG. 11, in this case, the bit 86 of the tool 80 is received in the receptacle 16 of the spindle 10 and the drill 84 is ready for use while the shank 81 is securely retained in place.

Although the invention has been explained in relation to its preferred embodiment, it is to be understood that many other possible modifications and variations can be made without departing from the spirit and scope of the invention as hereinafter claimed.

What is claimed is:

1. A chuck device comprising, in combination:

a tool having a shank including a first end and a second end, a first tool portion projecting from the first end of the shank, a second tool portion projecting from the second end of the shank, and an annular retaining groove defined in an outer periphery of the shank intermediate the first and second ends of the shank;

a housing including a first end and a second end, a spindle at the first end of the housing, a longitudinal hole extending from the second end of the housing, and a transverse countersink spaced between the first and second ends of the housing and communicating with the longitudinal hole;

a sliding sleeve slidably mounted around the housing for sliding along a longitudinal direction between an engaged position and a disengaged position, with the sliding sleeve being biased from the disengaged position to the engaged position;

a ball partially received in the transverse countersink, with the ball being moved into the longitudinal hole to engage the annular retaining groove of the tool when the sliding sleeve is in the engaged position; and a follower slidable in the longitudinal hole and biased from adjacent the first end of the housing towards the second end of the housing, with the follower ejecting the tool from the longitudinal hole of the housing, a passage formed in the follower for receiving one of the tool portions projecting from the shank when the ball engages the annular retaining groove of the tool.

2. The chuck device of claim 1 wherein the housing comprises, in combination: a stub having the spindle formed on an end thereof; and a tube separate from the stub, with the tube including a first section mounted around the stub and a second section, with the tube including the longitudinal hole, with the second section of the tube including the transverse countersink, with the second section of the tube including a first inner shoulder, with the follower including a first section and a second section, with the second section of the follower being of a size for slidable receipt in the longitudinal hole for abutting with and moving the ball out of the longitudinal hole of the tube, with the follower further including an outer shoulder intermediate the first and second sections of the follower and of a size larger than the longitudinal hole for bearing against the first inner shoulder of the second section of the tube, with the ball being moved out of the longitudinal hole by the abutment with the second section of the follower when the outer shoulder of the follower abuts with the inner shoulder of the second section of the tube.

3. The chuck device of claim 2 wherein the spindle includes a receptacle communicating with the longitudinal hole and for receiving one of the tool portions projecting from the shank when the ball engages the annular retaining groove of the tool.

4. The chuck device of claim 3 further comprising, in combination: an elastic member including a first end and a second end, with the follower including a receptacle for receipt of the second end of the spring, with the second end of the elastic member received in the longitudinal hole of the housing for biasing the follower towards the second end of the housing.

5. The chuck device of claim 4 further comprising, in combination: a compartment defined in the stub, with the second end of the elastic member received in the compartment, with the receptacle of the spindle communicating with the compartment.

6. The chuck device of claim 5 wherein the housing includes an outer shoulder formed on an outer periphery thereof and the sliding sleeve includes an inner shoulder formed on an inner periphery thereof, with the sliding sleeve being biased by elastic means positioned between the outer shoulder of the housing and the inner shoulder of the sliding sleeve.

7. The chuck device of claim 6 wherein the sliding sleeve includes an annular groove in the inner periphery and for receiving the ball when moved out of the longitudinal hole.

8. The chuck device of claim 7 wherein a bottom wall that defines the transverse countersink has a hole communicated with the longitudinal hole, whereby the ball is prevented from completely falling into the longitudinal hole by the bottom wall yet allowing the ball to partially move into the longitudinal hole.

9. The chuck device of claim 2 further comprising, in combination: an elastic member including a first end and a second end, with the follower including a receptacle for receipt of the second end of the spring, with the second end of the elastic member received in the longitudinal hole of the housing for biasing the follower towards the second end of the housing.

10. The chuck device of claim 9 wherein the housing includes an outer shoulder formed on an outer periphery thereof and the sliding sleeve includes an inner shoulder formed on an inner periphery thereof, with the sliding sleeve being biased by elastic means positioned between the outer shoulder of the housing and the inner shoulder of the sliding sleeve.

11. The chuck device of claim 10 wherein the sliding sleeve includes an annular groove in the inner periphery and for receiving the ball when moved out of the longitudinal hole.

12. The chuck device of claim 11 wherein a bottom wall that defines the transverse countersink has a hole communicated with the longitudinal hole, whereby the ball is prevented from completely falling into the longitudinal hole by the bottom wall yet allowing the ball to partially move into the longitudinal hole.

13. The chuck device of claim 1 wherein the spindle includes a receptacle communicating with the longitudinal hole and for receiving one of the tool portions projecting from the shank when the ball engages the annular retaining groove of the tool.

14. The chuck device of claim 13 wherein the housing includes an outer shoulder formed on an outer periphery thereof and the sliding sleeve includes an inner shoulder formed on an inner periphery thereof, with the sliding sleeve being biased by elastic means positioned between the outer shoulder of the housing and the inner shoulder of the sliding sleeve.

15. The chuck device of claim 14 wherein the sliding sleeve includes an annular groove in the inner periphery and for receiving the ball when moved out of the longitudinal hole.

16. The chuck device of claim 15 wherein a bottom wall that defines the transverse countersink has a hole communicated with the longitudinal hole, whereby the ball is prevented from completely falling into the longitudinal hole by the bottom wall yet allowing the ball to partially move into the longitudinal hole.

17. The chuck device of claim 1 wherein the housing includes an outer shoulder formed on an outer periphery thereof and the sliding sleeve includes an inner shoulder formed on an inner periphery thereof, with the sliding sleeve being biased by elastic means positioned between the outer shoulder of the housing and the inner shoulder of the sliding sleeve.

18. The chuck device of claim 17 wherein the sliding sleeve includes an annular groove in the inner periphery and for receiving the ball when moved out of the longitudinal hole.

19. The chuck device of claim 1 wherein the sliding sleeve includes an annular groove in an inner periphery thereof and for receiving the ball when moved out of the longitudinal hole.

20. The chuck device of claim 1 wherein a bottom wall that defines the transverse countersink has a hole communicated with the longitudinal hole, whereby the ball is prevented from completely falling into the longitudinal hole by the bottom wall yet allowing the ball to partially move into the longitudinal hole.

* * * * *